3,080,284
PHENAZINE FOR COMBATING LUNGWORM

Johan Dirk Bijloo and Engbert Harmen Reerink, Weesp, Netherlands, assignors to North American Philips Company, Inc., New York, N.Y., a corporation of Delaware
No Drawing. Filed Aug. 2, 1960, Ser. No. 46,910
Claims priority, application Netherlands Aug. 6, 1959
5 Claims. (Cl. 167—53)

Sheep and cattle are often affected with infections by lungworms, for example *Dictyocaulus filaria* or *viviparus*. These infections cause verminous bronchopneumonia which results in considerable wasting. In many cases, these infections end in the death of the animal afflicted. As a rule, the damage is not restricted to one animal but generally comprises many animals grazing in the same pasture. Especially the young animals are susceptible to this infection so that a stock farmer has difficulty in maintaining an even age distribution of his stock and, apart from the direct damage done by illness or death of the stock, this is felt as a big handicap in running a sound business.

Means are known to restrict the spreading of certain forms of lungworm infections, however, they generally have a preventive action only for animals not yet afflicted since they limit the pasture infection, and they cannot be considered suitable for curing clinically ill animals.

Vaccines are known comprising a suspension of attenuated larvae of the infectious stage of certain lungworms and by the administration of these vaccines satisfactory immunity against these infections is obtained. However, as a rule these vaccines have not proved capable of combating an existing infection.

It has now been found that the lungworms which are already present in the lungs at the time of the treatment, are expelled for the greater part while furthermore the infectious larvae taken in after the treatment are affected so that subsequent stages of development including those responsible for the clinical picture, cannot or cannot readily be evolved.

The treatment according to the invention is effective both in infested animals and in the prevention of infections and reinfections. Furthermore, pasture infection is also restricted.

According to the invention, sheep and cattle which act as hosts to these larvae of the third stage or which may be considered to be exposed to infection with these larvae are subjected to a phenazine cure. This cure consists in that phenazine in a dosage of from about 5 to 60 mg. per kg. of body weight is administered to sheep or cattle as described in the preceding paragraph. If desired, this treatment is repeated. The form of administration is comparatively arbitrary. Both the parenteral and the oral form may be used.

For the oral administration the phenazine may be mixed into the fodder. In order to prevent some animals from taking disproportionately large doses owing to the fact that they eat more than other animals, in many cases parenteral application is to be preferred, since this provides certainty about the dosage. Preferably the phenazine is injected intramuscularly. No sharp limits can be given of the permissible maximum of the total amount to be given to an animal, for example in repeated treatment. A favorable circumstance is the low toxicity of the phenazine for warm-blooded animals. Since as a rule the cure will not be repeated more than twice, for example with intervals of from 3 to 10 days, in practice the total dose will not exceed an amount of 200 mg. per kg. of body weight. The preparations suitable for combatting these infections can be produced in the usual manner by working phenazine up into tablets, dragées, powders, capsules, granules, solutions, dispersions, injection liquids or liquids suitable for spraying, for example aerosols or inhalation liquids.

The production of tablets preferably starts from the free bases of the neutral salts, since the acid salts, for example the hydrochloric acid or sulphuric acid salts, readily decompose unless stored at a pH of less than 4. In the production of the tablets, use may be made of the usual fillers and lubricants for facilitating the punching of the tablets. Furthermore substances may be used to promote the disintegration of the tablets in water. Suitable fillers are chalk, calcium phosphate, lactose or powdered sugar (saccharose) or mixtures thereof. In order to impart the required strength to the tablets, it may be desirable to use a mixture of lactose and powdered sugar, for example in a weight ratio between 1:1 and 4:1.

Powdered steatite (talc), magnesium stearate or calcium stearate may be used as lubricants. Known means for promoting the disintegration of the tablets in water are, for example, starches which swell in water, for example potato starch, corn starch or arrow root (*Amylum marantae*). The dragées may be made by coating tablets produced in the above-mentioned manner with sugar by treating them with a sugar syrup in a coating drum.

In order to produce injection liquids, phenazine may be suspended in distilled water with the addition of a dispersion agent. A suitable dispersion agent is commercially available under the trade name "Tween," for example a polyoxyethylene sorbitan monolaurate.

For the production of spraying liquids, use may be advantageously made of the technique developed for the production of aerosols. These comprise a propellant, for example Freon (as a rule non-toxic liquids having a low boiling point, which are liquid at room temperature) in which a solution or dispersion of the active substance to be dispersed is dissolved or emulsified.

Since the phenazine is poorly soluble in water, which may give rise to difficulty in producing injection liquids, the production of a thixotropic injection liquid is preferred. Such a liquid may be produced by adding to from 0.1 to 15 parts by weight of phenazine, 85 to 99.9 parts by weight of a thixotropic solution of 1 to 5 parts by weight of an aluminum salt of an aliphatic carboxylic acid containing from 14 to 20 carbon atoms and 95 to 99 parts by weight of an ester of an aliphatic alcohol containing from 1 to 5 atoms and an aliphatic carboxylic acid containing from 14 to 20 carbon atoms, the mixture being homogenized and subsequently sterilized.

For combating worm infections of the third stage, the tablets, powders, solutions, dispersions or spraying liquids may be added to the food or the drinking water. They may alternatively be administered orally. If desired, the spraying liquids, for example an aerosol of phenazine, may be sprayed either on the food or in the pharynx of the animal to be treated. As has been mentioned hereinbefore, a treatment, which may be repeated, with from 5 to 60 mg. of phenazine per kg. of body weight is sufficient. Owing to the low toxicity of phenazine, there is little likelihood of overdosage: the $LD_{50}$ values both for oral and for intraperitoneal administration are at least 750 mg. per kg. of body weight as was determined in experiments with mice.

Example 15 g. of finely ground phenazine were made up to 100 mls. with a thixotropic solution of 3 g. of aluminium monostearate in 97 g. of isopropyl myristate. After sterilization of the thixotropic liquid, sheep which were clearly clinically ill due to an infection with *Dictyocaulus filaria* were injected intramuscularly with 5 mls. The injection was repeated 72 hours after the first injection. After a few days it was observed that large numbers of lungworms of the adult stage were expelled through the respiratory tract and that the clinical condition improved considerably.

What is claimed is:

1. A veterinary preparation suitable for injection comprising a mixture of 0.1 to 15 parts by weight of phenazine, 85 to 99.9 parts by weight of a thixotropic solution of from 1 to 5 parts by weight of an aluminum salt of an aliphatic carboxylic acid of 14 to 20 carbon atoms and 80 to 98.9 parts by weight of an ester of an aliphatic alcohol of 1 to 6 carbon atoms and an aliphatic carboxylic acid of 14 to 20 carbon atoms.

2. The veterinary preparation of claim 1, wherein the mixture comprises phenazine, isopropyl myristate and aluminium monostearate.

3. A method of treating sheep and cattle which are infected with larvae of lungworms of the infectious stage or are exposed to such an infection, comprising administrating 5 to 60 mg. of a compound selected from the group consisting of phenazine and salts thereof per kg. of body weight to said animals and repeating said administration at intervals of from 3 to 10 days until the danger of such an infection has ceased.

4. The method of claim 3, wherein the administration takes place by admixing the phenazine in the fodder for the animal to be treated.

5. The method of claim 3, wherein the phenazine is injected intramuscularly.

References Cited in the file of this patent

UNITED STATES PATENTS

| | | |
|---|---|---|
| 2,294,884 | Austin | Sept. 8, 1942 |
| 2,507,193 | Buckwalter | May 9, 1950 |
| 2,540,131 | Litter | Feb. 6, 1951 |
| 2,802,772 | Elder | Aug. 13, 1957 |

OTHER REFERENCES

Levine: Chem. Abst., 48, p. 10936, 1954.

Levine: Am. J. of Vet. Research, July 1954, pp. 349–351.

Veterinary Drug Encyclopedia and Therapeutic Index, 5th edition, pp. 219–222.

U.S. Dept of Agriculture, Yearbook of Animal Diseases, 1956, pp. 290–291.